(12) United States Patent
Kung

(10) Patent No.: US 7,694,330 B2
(45) Date of Patent: Apr. 6, 2010

(54) PERSONAL AUTHENTICATION DEVICE AND SYSTEM AND METHOD THEREOF

(75) Inventor: Hsiang-Tsung Kung, Lexington, MA (US)

(73) Assignee: Industrial Technology Research Institute, Hsinchu (TW)

( * ) Notice: Subject to any disclaimer, the term of this patent is extended or adjusted under 35 U.S.C. 154(b) by 913 days.

(21) Appl. No.: 10/749,558

(22) Filed: Jan. 2, 2004

(65) Prior Publication Data

US 2004/0250076 A1 Dec. 9, 2004

Related U.S. Application Data

(60) Provisional application No. 60/473,365, filed on May 23, 2003.

(51) Int. Cl.
*G06F 15/16* (2006.01)
(52) U.S. Cl. ........................................................ 726/9
(58) Field of Classification Search ................. 713/175, 713/172; 726/9, 10, 20
See application file for complete search history.

(56) References Cited

U.S. PATENT DOCUMENTS

| | | | | |
|---|---|---|---|---|
| 4,529,870 | A | 7/1985 | Chaum | 235/380 |
| 4,590,470 | A | 5/1986 | Koenig | 340/825.31 |
| 4,661,658 | A | 4/1987 | Matyas | 380/23 |
| 4,882,779 | A | 11/1989 | Rahtgen | 380/24 |
| 5,020,105 | A | 5/1991 | Rosen et al. | 380/23 |
| 5,604,801 | A | 2/1997 | Dolan et al. | |
| 5,604,802 | A | 2/1997 | Holloway | 380/24 |
| 5,721,781 | A | 2/1998 | Deo et al. | 380/25 |
| 5,757,918 | A | 5/1998 | Hopkins | 380/25 |

(Continued)

FOREIGN PATENT DOCUMENTS

CN 1354936 A 6/2002

(Continued)

OTHER PUBLICATIONS

"iKey™ 1000 Series—Smart Devices for Two-Factors Authentication. A secure alternative to user names and passwords," *Rainbow Technologies, Inc.*, Apr. 27, 2001: pp. 1-7.

(Continued)

*Primary Examiner*—Ellen Tran
(74) *Attorney, Agent, or Firm*—Finnegan, Henderson, Farabow, Garrett & Dunner, LLP

(57) ABSTRACT

The present invention provides a flexible, tamper-resistant authentication system, or personal authentication device (PAD), which can support applications in authentication, authorization and accounting. The PAD stores at least one public key associated with a certificate authority (CA) and receives one or more digital certificates, which may be authenticated based on the stored CA public keys. The PAD outputs a service key that, depending on the application, may be used to gain access to a controlled space, obtain permission for taking a certain action, or receive some service. The operation of the PAD and the nature of the service key may be determined by digital certificates that it receives during operation. Using a stored PAD private key that is kept secret, the PAD may perform a variety of security-related tasks, including authenticating itself to a user, signing service keys that it generates, and decrypting content on received digital certificates.

75 Claims, 3 Drawing Sheets

U.S. PATENT DOCUMENTS

| | | | | |
|---|---|---|---|---|
| 5,790,667 | A | 8/1998 | Omori et al. | 380/23 |
| 6,003,113 | A | 12/1999 | Hoshino | 711/106 |
| 6,067,621 | A * | 5/2000 | Yu et al. | 713/172 |
| 6,073,237 | A | 6/2000 | Ellison | |
| 6,134,550 | A | 10/2000 | Van Oorschot et al. | 709/9 |
| 6,138,235 | A | 10/2000 | Lipkin et al. | 713/155 |
| 6,144,743 | A | 11/2000 | Yamada et al. | 380/44 |
| 6,192,131 | B1 * | 2/2001 | Geer et al. | 380/283 |
| 6,215,872 | B1 | 4/2001 | Van Oorschot | |
| 6,226,744 | B1 * | 5/2001 | Murphy et al. | 726/5 |
| 6,257,486 | B1 * | 7/2001 | Teicher et al. | 235/380 |
| 6,513,116 | B1 | 1/2003 | Valente | 713/155 |
| 6,715,082 | B1 * | 3/2004 | Chang et al. | 726/8 |
| 6,732,278 | B2 * | 5/2004 | Baird et al. | 726/7 |
| 6,792,536 | B1 * | 9/2004 | Teppler | 713/178 |
| 7,083,090 | B2 | 8/2006 | Zuili | |
| 7,085,840 | B2 * | 8/2006 | de Jong et al. | 709/229 |
| 2002/0026578 | A1 * | 2/2002 | Hamann et al. | 713/159 |
| 2002/0056747 | A1 | 5/2002 | Matsuyama et al. | |
| 2003/0212888 | A1 | 11/2003 | Wildish et al. | |
| 2004/0006695 | A1 * | 1/2004 | Ishibashi et al. | 713/175 |
| 2004/0250076 | A1 | 12/2004 | Kung | |

FOREIGN PATENT DOCUMENTS

| | | |
|---|---|---|
| CN | 1393017 A | 1/2003 |
| KR | 2001-8028 A | 2/2001 |
| KR | 2003-27066 A | 4/2003 |
| WO | WO 01/11845 A2 | 2/2001 |

OTHER PUBLICATIONS

Clarke, D., et al., "Certificate Chain Discover in SPKI/SDSI," Sep. 13, 2001: pp. 1-26.

Adams, C. et al., "Internet X.509 Public Key Infrastructure Certificate Management Protocol," Apr. 2003: pp. 1-89.

Malpani, A. et al., "Simple Certificate Validation Protocol (SCVP)," Dec. 2002: pp. 1-44.

"Hotel/Hospitality Security. Keyless Entry Electronic Door Lock," *Applied Safe & Vault*, retrieved Jun. 2, 2003, from http://www.alliedsafe.com/hospitality/electronic_locks.php: pp. 1-2.

"Personal identity Manager," *IDEX*, retrieved May 23, 2003, from http://www.idexsys.com/pim.htm: pp. 1-2.

"Public Key Infrastructure (PKI) FAQs," *Articsoft*, retrieved Jun. 12, 2003, from http://www.articsoft.com/wp_pki_faq.htm: pp. 1-5.

"Check Point VPN-1™ SecuRemote™/SecureClient™ & SecurRemote NG™/SecureClient Ng™," *Alladin*, retrieved on Jun. 2, 2003, from http://www.ealaddin.com/etoken/enterprise/datasheets/DS_CheckPoint_SecuRemote.asp?cf=t1:pp. 1-3.

Kagal, L. et al., "Trust-Based Security in Pervasive Computing Environments," *University of Maryland, Baltimore County*, Dec. 2001: pp. 1-5.

English Translation of Office Action from the German Patent and Trademark Office for German Patent Application No. 10 2004 025 084.7-31, pp. 1-3.

Office Action dated Oct. 18, 2006, in U.S. Appl. No. 10/609,586, filed Jul. 1, 2003. (19 pages).

Translation of Notification of Reasons for Refusal from the Korean Patent Office, dated Dec. 26, 2006 (3 pages).

First Examination Opinions Notification from the State Intellectual Property Office of the People's Republic of China in Application No. 2004100459023, dated Jan. 26, 2007 (18 pages).

Office Action from the German Patent and Trademark Office (3 pages).

Zou et al., "Security E-commerce System Combined with Fingerprint Identification and Smart Card," Computer Engineering, Jan. 2003 (3 pages).

Zang, "ATM Minimarts," Recent Developments in Science Technology Abroad, No. 7, 2002 (3 pages).

* cited by examiner

PERSONAL AUTHENTICATION DEVICE AND SYSTEM AND METHOD THEREOF

RELATED APPLICATIONS

This application claims the benefit of U.S. Provisional Patent Application No. 60/473,365, filed May 23, 2003, and U.S. patent application Ser. No. 10/609,586, filed Jul. 1, 2003, both entitled "Personal Authentication Device and System and Method Thereof," and both of which are incorporated herein by reference.

FIELD OF THE INVENTION

The present invention generally relates to digital authentication and, more particularly, to a personal authentication device using digital certificates.

BACKGROUND OF THE INVENTION

"Authentication," in general, is the process of determining that a person is who he or she claims to be. Airline travelers, for example, authenticate themselves at an airport by presenting to airline officials a photo-bearing document bearing the traveler's name, such as a driver's license or passport (a "certificate"), and the traveler's face (a "credential"), which can be matched with the photo on the document. In this example, an airline official checks the credential against the information on the "certificate" and, if it matches, the traveler is "authenticated" and allowed to board the airplane.

The notion of "authentication" is closely related to those of "authorization" and "accounting." An entity is typically authenticated before being allowed to receive a service, whereas accounting is performed after the service is provided.

Public key infrastructure (PKI) is a security architecture that has been developed to provide an increased level of confidence for exchanging information electronically over an insecure network. A PKI can include many different elements, but generally means the methods, techniques, and devices that together provide a secure infrastructure. PKIs can be used to authenticate the sender or recipient of electronic information and/or authenticate that the content of an electronic document or message has not been deliberately altered or otherwise modified. Generally, a PKI provides security by using a mathematical technique called public-key cryptography. Public-key cryptography uses a pair of mathematically related cryptographic keys, referred to as the "private key" (or "secret key") and the "public key." If one key is used to encrypt information, then only the related key can decrypt that information. If you know one of the keys, you cannot easily calculate what the other one is. As their names indicate, the private key is intended to be associated uniquely with one user and kept secret. The public key may be freely distributed and known to anyone.

Public-key encryption may be used to send information confidentially. For example, a sender may encrypt a message with the recipient's public key, which the sender has received from the recipient or obtained from a public directory. The recipient may then use his private key to decrypt the message.

"Digital certificates" and a "certificate authority" (CA) may be used to authenticate the identity of the entity associated with the public/private key pair. A CA is a trusted individual or organization (public or private) that issues, manages and revokes digital certificates. Although some applications, such as PGP, allow users to generate digital certificates themselves, a more "trusted" digital certificate may be obtained from a bona fide CA.

The CA may generate the public/private key pair in the digital certificate or sign the public key of a requester (after the CA verifies the identity of the requester). The CA verifies the credentials provided by the certificate requester and, upon confirming the requester's identity, digitally signs the digital certificate with the CA's private key.

A digitally-signed message or certificate may be authenticated by determining if the digital signature on the message or certificate is valid. When sending a signed message, the sender may also send his public key, alone or embodied in a digital certificate. A signed certificate will also indicate the identity of the CA that signed the digital certificate. The recipient of a digitally signed message or certificate may use the public key associated with the signer, as well as other information in the digital certificate, to determine if the signature is valid.

In conventional electronic authentication systems, authentication of digital certificates often requires a network connection between an authentication server (such as the server of the CA that issued a digital certificate) and the individual wishing to authenticate a document (or the device node where the individual is located). Typically, to authenticate a digital certificate, a user or a device using conventional authentication services, an entity must connect across a network to an authentication server, which then performs authentication at the network server. Faulty, disconnected or unsecured network and server conditions, such as a network or server under denial-of-service attacks, may undesirably result in defective or failed authentication.

There is thus a general need in the art for an authentication device and method overcoming at least the aforementioned shortcomings in the art. A particular need exists in the art for an authentication device and method overcoming disadvantages in authentication over networks under faulty network and server conditions.

SUMMARY OF THE INVENTION

Accordingly, one embodiment of the present invention is directed to a personal authentication device, method and system that obviate one or more of the problems due to limitations and disadvantages of the related art.

To achieve these and other advantages, and in accordance with the purpose of the invention as embodied and broadly described, there is provided a personal authentication device (PAD) comprising at least one storage medium storing at least one CA public key, each public key associated with a certificate authority (CA). The PAD also comprises one or more input means for receiving one or more digital certificates. A processing component authenticates the one or more received digital certificates using the at least one stored CA public key and generates at least one service key based on the one or more authenticated digital certificates. An output means outputs at least one service key.

Also provided is an authentication method. At least one CA public key, each public key associated with a certificate authority (CA), is stored on a personal authentication device (PAD). One or more digital certificates are received by the PAD. The one or more received digital certificates is authenticated using the at least one stored CA public key. At least one service key is generated based on the one or more authenticated digital certificates and output by the PAD.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION OF THE INVENTION

Reference will now be made in detail to the present embodiments of the invention, examples of which are illustrated with reference to the accompanying drawings. Wherever possible, the same reference numbers will be used throughout the drawings to refer to the same or like parts.

Methods and systems consistent with the present invention provide an authentication system that can support a broad range of applications. Certain methods and systems consistent with the present invention provide an authentication system that can be used offline, that is, without requiring a network connection for authentication. The present invention further provides an authentication device whose exact operation may be flexible and determined by digital certificates that it receives during operation. The present invention further provides an authentication device that outputs a service key that, depending on the application, may be used to gain access to a controlled space or other entity.

Figure 1:
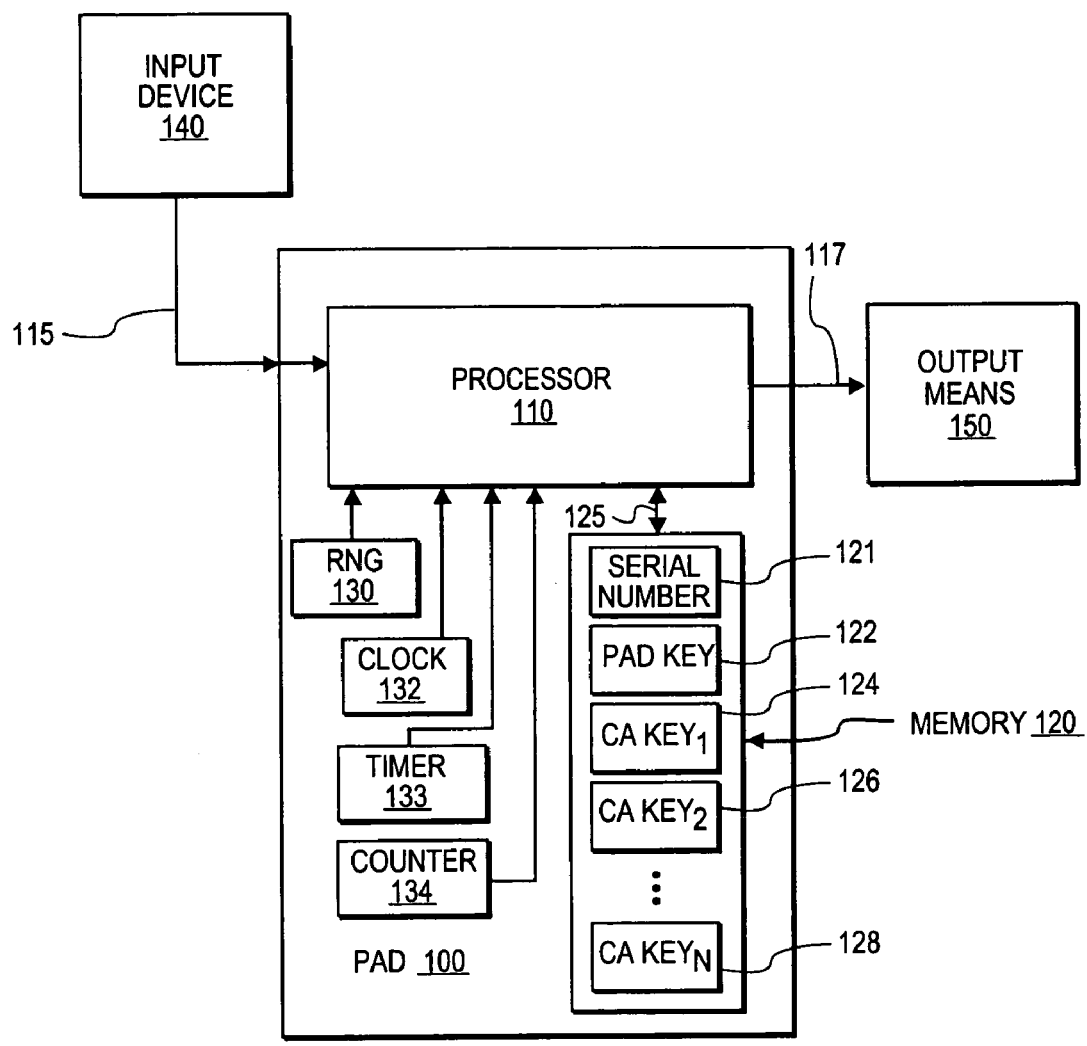
FIG. 1 is a block diagram of a personal authentication device (PAD 100) consistent with the principles of the present invention.

FIG. 1 is a block diagram of a personal authentication device (PAD 100) consistent with the principles of the present invention. As shown in FIG. 1, a PAD 100 consistent with the present invention comprises a processor 110 and a memory 120 operatively coupled by a bus 125. Processor 110 may represent one or more processing devices configured to execute software and to perform certain authentication processes consistent with certain aspects of the invention. Memory 120 may be one or more memory devices that store data as well as software and control code used and/or executed by processor 110 and other hardware on PAD 100. Although one memory 120 is shown, memory 120 may comprise any number of memories. For example, memory 120 may include one or more memories that store software components that, when executed by processor 110, perform one or more authentication processes. Memory 120 may also comprise one or more of RAM, ROM, magnetic and optical storage, organic storage, audio disks, and video disks.

As shown in FIG. 1, memory 120 may store a PAD private key (PAD Key 122) and one or more CA public keys (CA Key$_1$ [124], CA Key$_2$ [126], ... CA Key$_N$ [128]). In certain embodiments, PAD Key 122 is the private key of a pair of mathematically-related cryptographic keys generated using public-key cryptography and which are associated with PAD 100. Each of CA Keys$_{1-N}$ may be the public key of a pair of mathematically-related cryptographic keys generated using public-key cryptography, each of the pairs of keys associated with CA 1-N, respectively.

PAD 100 may optionally comprise a PAD private key (PAD Key 122). PAD Key 122 is associated uniquely with a PAD or a group of PADs under the same management. While its corresponding public key may be known to anyone, PAD Key 122 is a secret not known to users. In certain embodiments, hardware and software means are provided to protect PAD Key 122 from being read from outside PAD 100. PAD 100 may use, for example, PAD Key 122 to authenticate PAD 100 to a user, sign a service key that the PAD 100 outputs, and decrypt content on a received digital certificate that is encrypted with the corresponding public key of PAD 100.

In at least one embodiment, PAD Key 122 and/or CA Keys$_{1-N}$ (124, 126, 128) are not rewriteable. In this example, these keys are written into the PAD 100 only once. For example, PAD Key 122 and/or CA Keys$_{1-N}$ (124, 126, 128) may be burned into memory once during the manufacturing process. In at least one embodiment, PAD Key 122 and/or CA Keys$_{1-N}$ (124, 126, 128) may not be rewriteable but may be read into memory 120 from outside PAD 100.

In certain embodiments, PAD 100 may also comprise a PAD serial number 121, which may be a unique number associated with the PAD 100. PAD serial number 121 may be, for example, stored in memory 120 and may also be burned into memory once during the manufacturing process or read into memory 120 from outside PAD 100 in such a manner that the PAD serial number is written only once. In certain embodiments, PAD serial number 121 may be used in the generation of the service keys. In some embodiments, the PAD serial number 121 may be associated with the service keys generated by the corresponding PAD 100 in such a manner that it would be possible to determine which PAD 100 generated the service key.

PAD 100 may also optionally comprise a random number generator (RNG) 130 (or a pseudo-random number generator). RNG 130 (or a pseudo-random number generator) may be used, for example, to generate session keys or other parameters used in the authentication, authorization and accounting process. For example, RNG 130 (or a pseudo-random number generator) may be used to generate random (or pseudo-random) session keys in a challenge and response protocol. Furthermore, RNG 130 may be used to generate random (or pseudo-random) one-time keys. In certain embodiments, PAD 100 may use a one-time key in the generation of a cookie, a type of service key. PAD 100 may store the one-time key in memory 120. After receiving a cookie from PAD 100, a user may submit the cookie to PAD 100 in conjunction with a future service request. Based on the stored one-time key, PAD 100 will validate the submitted cookie. If the cookie validation is successful, PAD 100 may allow the service. If the service is allowed, PAD 100 may also invalidate the one-time key stored in memory 120, so that PAD 100 will not be able to validate the same cookie in the future, thereby preventing replay of the same cookie.

This cookie mechanism may be useful in a number of different applications. In one exemplary embodiment, such as a Digital Rights Management (DRM) system, PAD 100 may write into a cookie usage information that may describe, for example, the number of times associated content may be used or has been used. To activate a new use of the content, PAD 100 must receive a cookie that can pass the cookie validation process. If the received cookie is validated, and if the usage count in the received cookie does not exceed a specified limit, PAD 100 may allow one-time use of the content, and invalidate the one-time key stored in memory 120. In certain embodiments, PAD 100 may generate a new cookie comprising, for example, a new one-time key. In the new cookie, the usage count may be incremented to reflect the allowed use that occurred since the cookie was received and the new cookie may be transmitted to the user. This type of cookie-based scheme may also be used to track simultaneously the usages of multiple pieces of content by, for example, having each cookie record all their usage counts.

PAD 100 may optionally comprise a clock 132, which may be used, for example, in determining whether or not the current date and time are within the validity period of digital certificates and in generating timestamps to be included in service keys that PAD 100 generates. A timestamp on a service key can help determine, for example, if the service key is too old or if clock 132 has drifted. If any of these cases is true, then a service provider may choose not to honor the service key. Moreover, a clock 132 may be used, for example, in determining whether or not one or more rights to digital content in a DRM system have expired.

PAD 100 may optionally comprise one or more timers 133, which may be used, for example, in determining whether or not digital content in a DRM system is used or accessed within an allowed usage period. Timers 133 may also be used, for example, to determine time that has elapsed since a timer was reset.

PAD 100 may optionally comprise one or more counters 134, which may be used, for example, in determining whether or not digital content in a DRM system is within an allowed usage count. Counters may also be used, for example, in determining the number of times an event has occurred since a counter was reset.

In certain embodiments, one or more of the components of PAD 100, or PAD 100 itself, is tamper-resistant. A component or device is "tamper-resistant" for the purposes of this application if the component or device is protected from unauthorized access by techniques that make unauthorized access impossible or difficult. Techniques that make a component or device "tamper-resistant" may be different depending on whether the component is implemented in hardware or software. For example, a hardware component that is "tamper-resistant" may be constructed using materials that cannot be physically opened or entered. Tamper resistance of electronic data may be achieved by storing the data in such a manner that it may not be read, altered, or erased without authorization. In certain embodiments of the present invention, PAD Key 122 is protected by such tamper resistance techniques to prevent it from being read from outside PAD 100.

In embodiments consistent with the present invention, PAD 100 either comprises an input device or, as shown in FIG. 1, is operatively connected to an input device, such as input device 140. Input device 140 may be any device capable of receiving information and converting it to digital information for use by PAD 100. Input device 140 may be, for example, a keyboard or key pad, card reader, USB device, fingerprint or other biometric reader, camera, scanner, CD/DVD reader, handset or handheld device, personal digital assistant (PDA), wireless interface, personal computer, and/or Internet connection. Input device 140 may be used, for example, to read digital certificate information from a smart card, magnetic strip card, or printed document. Input device 140 may also be used, for example, to receive user identification information such as PINs, passwords, fingerprints, retinal patterns, or other biometric information. Connection 115 may be any type of connection through which digital data may be passed, such as a bus or a wireless connection, among others.

In embodiments consistent with the present invention, PAD 100 either comprises an output device or, as shown in FIG. 1, is operatively connected to an output device, such as output device 150. Output device 150 may be any device capable of outputting a service key to any other devices such as a display, printer, card reader, USB device, CD/DVD writer, door lock, handset or handheld device, personal digital assistant (PDA), personal computer, server, and/or Internet connection. Output device 150 may be used, for example, to output a service key to a door lock for opening a door, to a printer for printing a service coupon, or to a monitor for displaying a service number. Output device 150 may also be used, for example, to store a service key on a portable storage device, such as a smart card, magnet strip card, or other portable memory device. In some embodiments, output device 150 may be a device capable of wirelessly transmitting the service key to a service key receiver, such as an electronic door lock. Connection 117 may be any type of connection through which digital data may be passed, such as a bus or a wireless connection, among others.

Figure 2:
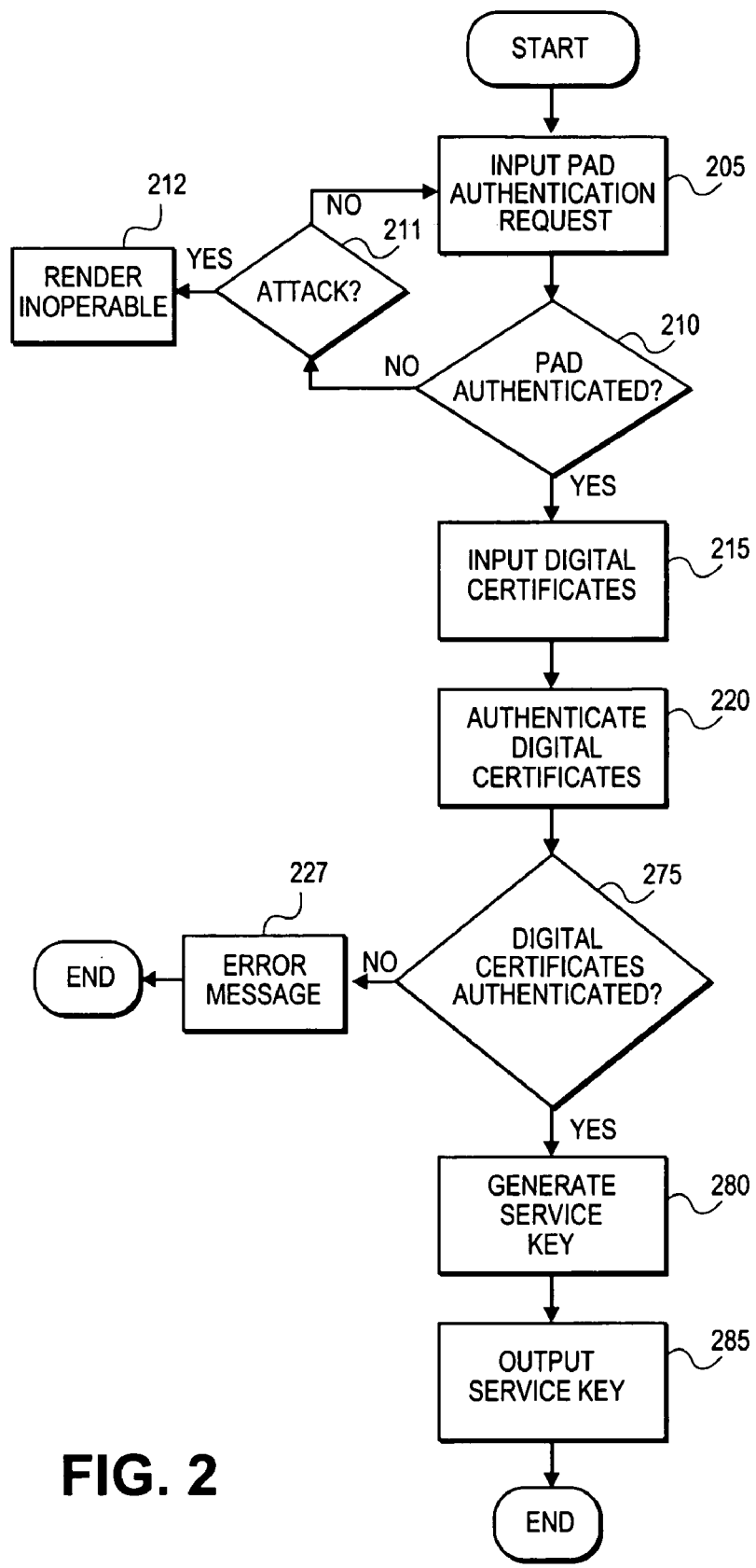
FIG. 2 is a flow chart showing one exemplary method of authentication consistent with the principles of the present invention.

In one exemplary implementation, operation of the instant invention may be consistent with the steps illustrated in the flowchart of FIG. 2. It should, however, be understood that other alternative method steps may be employed and, even with the method depicted in FIG. 2, the particular order of events may vary without departing from the scope of the present invention. Further, certain steps may not be present and additional steps may be added without departing from the scope and spirit of the invention as claimed.

As shown in FIG. 2, the authentication process may begin with a user wishing to authenticate PAD 100. For example, before using the PAD, an user may wish to determine whether the user has the correct physical device or check that the PAD 100 is associated with a certain private key (also called a "proof of possession" test). A user may authenticate PAD 100 by, for example, inputting a PAD authentication request (step 205). A PAD user may input a PAD authentication request by way of input device 140, shown in FIG. 1.

The PAD authentication request may involve, for example, a challenge and response protocol where the user may, for example, submit to PAD 100 a randomly selected value encrypted with the public key corresponding to PAD Key 122 and challenge PAD 100 to decrypt the value. A PAD with the correct PAD Key 122 will be able to succeed in responding to the challenge. In this case, PAD 100 is said to be authenticated to the user.

If PAD 100 receives an excessive number of PAD authentication requests, PAD 100 may try to determine if these requests represent an attack (step 211), which could be, for example, an attempt to guess the PAD private key (PAD Key 122). PAD 100 may render the device inoperable (step 212) if it determines that there is an attack. For example, PAD 100 may allow a certain number of PAD authentication requests in a given period of time before blocking all future uses of the device.

If PAD 100 is authenticated (step 210), one or more digital certificates may be input into the PAD. Conventional digital certificates, such as those that conform to the ITU (IETF) standard X.509 v3, governing digital certificates, typically include digital certification information, such as the name of the certificate owner, a public key associated with the certificate owner, dates of validity of the certificate, the name of the CA that issued the digital certificate, the actions for which the keys may be used, and the method the CA used to sign the digital certificate (eg. RSA).

In certain embodiments, digital certificates may also comprise other information in addition to or in place of that found in conventional digital certificates. For example, the digital certificates may comprise information that may be used to reset the clock, timers, or counters of the PAD. In some embodiments, digital certificates may comprise a content decryption key and/or descriptions of content rights that the PAD will check before outputting the content decryption key as a service key. In certain embodiments, the digital certificates may comprise other digital rights management information that may describe or define limits on a content expiration time, a content usage period, and/or a content usage count.

Digital certificates, and digital certificate information, may have been generated by the signing CA or the information in a digital certificate may have been generated by another party (including the certificate owner) and "signed" by a CA. In many instances, the CA verifies the credentials provided by the certificate owner and, upon confirming the certificate owner's identity, digitally signs the digital certificate with the CA's private key.

Digital certificates and digital certificate information may be input into PAD 100 in any of a number of ways known to those skilled in the art. For example, digital certificates may be stored on a physical medium, such as paper, card, or chip, and the digital certificate information stored on the physical medium may be input into PAD 100 by, for example, reading the information from the physical medium by using an input device, such as a scanner, card reader, or other input device. The input device may be separate from PAD 100 and capable of providing data electronically to PAD 100, either via physical connection or wirelessly. In certain embodiments, digital certificates and digital certificate information may be input into the PAD 100 from, for example, another device or computer across the Internet or other network connection. In other embodiments, digital certificate information is entered into PAD 100 by, for example, using a keyboard, mouse, user interface, or other conventional input device.

In certain embodiments, all digital certificate information is received or available locally and all authentication operations may be performed at PAD 100 without needing Internet or network connections.

One or more of the digital certificates received in step 215 may be authenticated in step 220. Authentication of digital certificates may involve, for example, checking whether the digital certificate is still valid. As described above, a digital certificate may comprise information indicating a period of validity. If so, the process of authentication may involve checking the current date and time (which may be obtained, for example, from clock 132) against the validity period of the digital certificate.

In addition, digital certificates may be "signed" by an issuing CA using the CA's private key. In this example, the one or more digital certificates may be authenticated using the corresponding stored CA public key. Another exemplary method for authenticating and using digital certificates consistent with the principles of the present invention will be described in more detail below, with reference to FIG. 3.

If the one or more digital certificates are not authenticated (step 275), PAD 100 may optionally return an error message to the user and fail to operate. Alternatively, PAD 100 may merely fail to operate without providing the user with an error message.

If one or more of the digital certificates are authenticated (step 275), the information stored in PAD 100 and associated with the one or more digital certificates may be used to generate a service key (step 280). For example, one or more service key generation programs may be stored on PAD 100 and information in the one or more digital certificates may indicate the particular service key generation program and parameters to use. In some embodiments, the service key generation program may be provided to PAD 100 via the one or more digital certificates. In another embodiment, the one or more digital certificates may indicate one or more service key generation programs and from where it may be obtained, however, the service key generation program may be obtained via input device 140. In certain embodiments, the service key may be digitally signed using PAD private key 122.

In step 285, the service key may be output using, for example, output device 150 of FIG. 1. The outputted service key may take many forms. For example, the service key may be output to a printer or display device for later use by the user. In certain embodiments, the service key may be transmitted electronically or wirelessly to a key device, where it may be stored permanently or temporarily. In some embodiments, such as an electronic door lock example, the service key may be embodied in a signal and wirelessly transmitted to a key receiver in a door and used to unlock the door.

Figure 3:
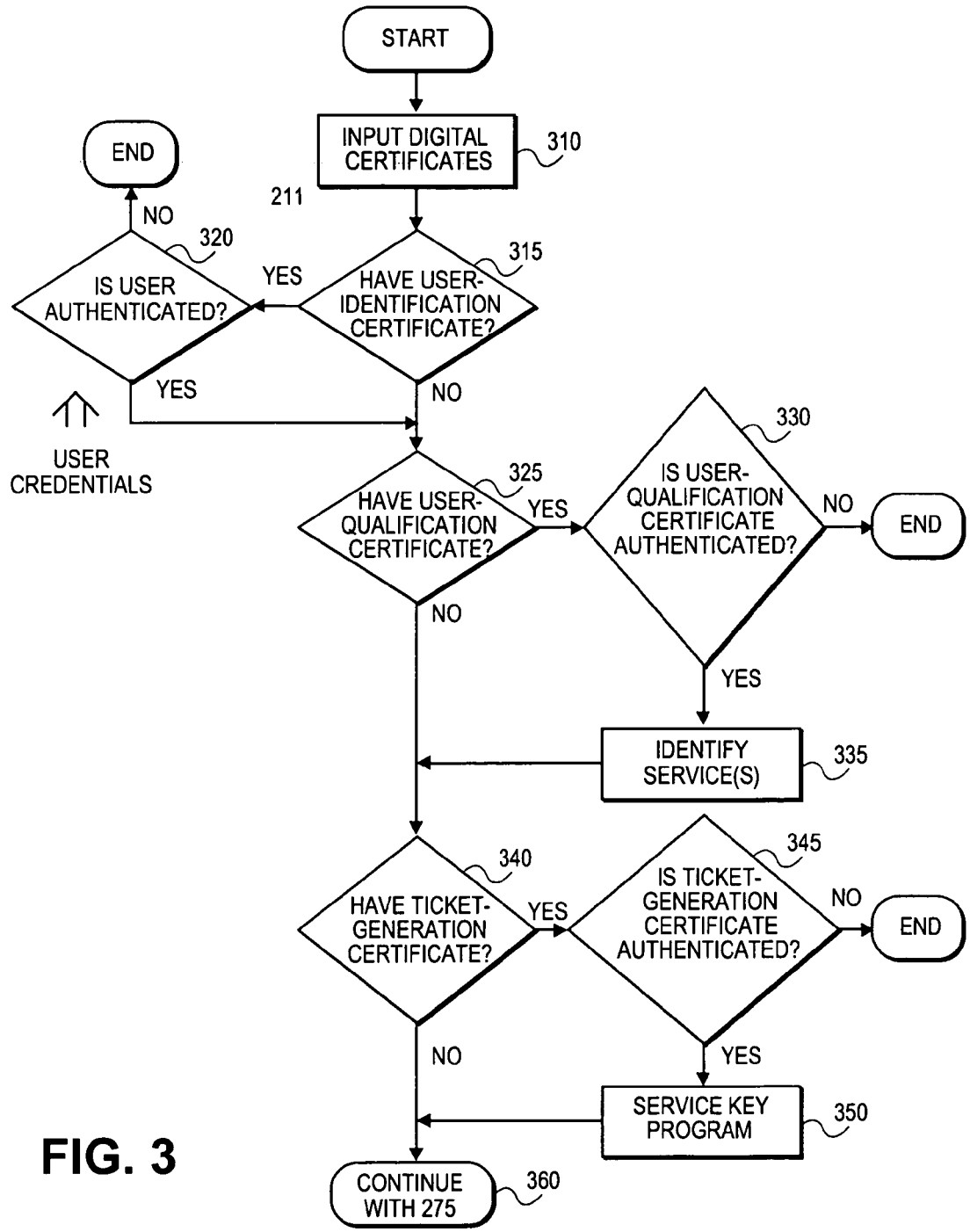
FIG. 3 illustrates the steps of an exemplary method for using the one or more digital certificates that may be received in step 215 of FIG. 2.

FIG. 3 illustrates the steps of an exemplary method for using the one or more digital certificates that may be received in step 215 of FIG. 2. As shown in FIG. 3, one or more digital certificates are input to PAD 100 (step 310). The one or more digital certificates may comprise various information which may be used in authenticating the user and generating a service key.

For example, the one or more digital certificates may comprise information identifying the user, such as the user's name, address, email address, date of birth, social security number, credit card number, or other information that may identify the user. A digital certificate that comprises user identifying information is referred to herein as a "user-identification certificate." The amount of user identifying information provided by a digital certificate may vary depending, for example, on the requirements of the application. In an airline check-in application, for example, the airline may require that the user provide name, address, date of birth and other information. However, a hotel key application may require less information.

One or more digital certificates may comprise user-qualification information, that is, information that indicates that a user is "qualified" or entitled to receive access to certain services. For example, in an airline check-in application, user-qualification information may comprise information indicating that a user is a frequent flyer or a member of an airline club that entitles a traveler to use a certain lounge. In a hotel key application, for example, user-qualification information may include information indicating that a hotel employee that performs cleaning may be granted access to every room, but only during business hours.

Other digital certificates consistent with the present invention may provide information for extending the access to services available to the user. Consider, for example, a frequent flyer of one airline who is granted access to its private lounges. If the airline has entered into reciprocity agreements whereby two or more airlines agree to allow their frequent travelers to visit each other's lounges, then this frequent flyer can access these other airlines' lounges. Digital certificate information may be provided to the PAD 100 which indicates that if a user is authenticated for a certain set of services, the user will also be authenticated for an additional set of related services.

One or more digital certificates may have information relating to the generation of the service key. Such certificates are referred to herein as "ticket-generation certificates" and may include, for example, information indicating the length of a key, a key-generation program or algorithm, and a format for outputting the key.

FIG. 3 describes an exemplary method for using the various information received via the one or more digital certificates. If, for example, PAD 100 determines that it has received a user-identification certificate (step 315), PAD 100 may first authenticate the digital certificate and then use the information in the user-identification certificate to authenticate the user (step 320). As described above, a digital certificate may be authenticated by determining the certificate-issuing authority and determining if the digital signature on the certificate is associated with the specified issuing authority by using the CA's public key. In certain embodiments of the present invention, the public key of the CA that issued the user-identification certificate is one of CA Keys$_{1-N}$ stored in PAD 100.

If PAD 100 determines that the user-identification certificate is authenticated, PAD 100 may authenticate the user based on the information in the user-identification certificate and certain user credentials received from the user. User credentials, as used herein, mean information uniquely associated with the user, such as a user's private key in a PKI, the user's biometric information, personal identification number (PIN) known only to the user, or other information computed using the PIN. User credentials may be received from the user via input device 140 of FIG. 1. User credentials, such as a PIN or private key, may be entered by, for example, the user using a key pad or card reader. User credentials, such as biometric information, may be obtained by way of a biometric reader, such as, for example, a fingerprint reader, retinal scanner, or video camera. In addition, user credentials may be computed from one or more other user credentials, such as the PIN.

To authenticate the user, the user credentials may be compared to the information on the user-identification certificate. If the user is not authenticated in step 320, the process may stop and the PAD 100 may be rendered inoperable. If the user can be authenticated, the process continues such as with step 325.

If PAD 100 receives an excessive number of user authentication requests, PAD 100 may try to determine if these attempts represent an attack, such as, for example, an attempt by a user to guess the user credentials of some other users. If so, PAD 100 may render the device inoperable. For example, PAD 100 may allow a certain number of user authentication requests in a given period of time before blocking all future uses of the device. This situation is similar to step 212.

One or more of the digital certificates input into PAD 100 may include a user-qualification certificate. A user-qualification certificate as used herein is a digital certificate that comprises information identifying a service that a user is entitled to receive or an action that the user is allowed to take.

If the user-qualification certificate is authenticated (step 330), one or more services to which the user should have access may be identified based on the certificate. For example, as mentioned above, the user-qualification certificate may comprise information indicating that a user is entitled to use premium services or, in a hotel key application, only granted access to certain areas.

The one or more digital certificates may optionally include a ticket-generation certificate (step 340). As described above, a ticket-generation certificate may include, for example, a service key generation program or information indicating a service key generation program. Information indicating a service key generation program may include, for example, information identifying a service key generation program that may be stored on PAD 100 or available via one or more input devices 140.

If the ticket-generation certificate is not authenticated (step 345), the process may stop and PAD 100 may be rendered inoperable. If the ticket-generation certificate is authenticated, a service key generation program is identified, and the process continued with step 280 of FIG. 2.

FIG. 3 shows one example of steps of a method consistent with the present invention and shows the use of multiple digital certificates. However, the present invention may also receive the digital certificate information referred to herein in the form of one digital certificate.

The one or more digital certificates may optionally comprise other information such as, for example, information that directs how a PAD 100 may operate for one or more uses. For example, the one or more digital certificate may comprise "operations information," describing, for example, how one or more digital certificates are linked together, challenge and response protocols for user and PAD authentication, information indicating the format for the outputted service key, secure protocols for data input and output, and other management protocols.

Additionally, digital certificates may be input into the PAD 100 to provide the public keys of additional CAs other than those stored in PAD 100. These digital certificates may be related such that they form any of a number of trust models as is understood by one skilled in the art. For example, the digital certificates may be "cross-certificates," wherein one certificate is created by one CA certifying the public key of another CA. In certain embodiments, the digital certificates may form a certificate chain, or "chain of trust," such that each of the certificates in the chain certifies the public key of the CA preceding it in the chain. Other trust models, such as hierarchical or root models, may also be used.

The present invention may have application in, for example, a security system, such as one used by a hotel. In the hotel example, multiple PAD 100s may be manufactured for use as access keys, used by both hotel employees and guests. Each of multiple PAD 100s may be similarly situated and configured, having generally the same structure and components. For example, these multiple PAD 100s may have the same PAD private key (PAD Key 122). However, based on received digital certificates, any of the PAD 100s may be programmed to perform different operations for different sessions. For example, in the hotel example, a PAD 100 may be programmed using a user-identification certificate, such that the service key that can open the door of any particular room may only be generated by the appropriate user. Each user, whether guest or employee, may have to authenticate him or herself via the PAD 100 in order to for it to generate the service key. Additionally, a PAD 100 may be programmed by using user-qualification certificates to indicate which services a user should be allowed to use. For example, in the hotel example, by using user-qualification certificates, only premium guests may generate the service keys to allow access to a special spa area or other services for which the guest may pay a premium. Likewise, certificates may be used such that employees are only allowed to generate service keys to areas in which they need to be.

The present invention may find application in other exemplary systems such as computer security systems having a plurality of user terminals, restricted access databases or security systems, and a computer or network or database system having multiple device nodes.

In another example, the principles of the present invention may be used to control entry to a controlled area, such as an office or laboratory.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A personal authentication device (PAD) comprising:
   at least one storage medium storing at least one CA public key, each public key associated with a certificate authority (CA);
   one or more input means for receiving one or more digital certificates, wherein the one or more digital certificates comprise at least one ticket-generation certificate including at least one service key generating program or information indicating at least one service key generating program;

a processing component for authenticating the one or more received digital certificates using the at least one stored CA public key, and generating at least one service key based on the one or more authenticated digital certificates; and an output means for outputting the at least one service key, wherein the at least one storage medium comprises at least one component for storing a PAD private key associated with the PAD and used by the PAD to authenticate the PAD to a user, and wherein the one or more input means comprises at least one component for receiving a PAD authentication request from the user; the processing component comprises at least one component for responding to the PAD authentication request using the stored PAD private key; and the output means comprises at least one component for outputting responses to the PAD authentication request.

2. The personal authentication device (PAD) of claim 1, wherein the processing component comprises at least one component for authenticating the at least one received ticket-generation certificate using the at least one stored CA public key; and if one or more ticket-generation certificates are authenticated, generating the at least one service key based on the at least one authenticated service key generating program, wherein the at least one service key may be used by a user to obtain access to at least one service.

3. The personal authentication device (PAD) of claim 1, wherein the one or more digital certificates further comprise:

a user-identification certificate comprising information uniquely associated with a user;

and wherein the processing component comprises at least one component for authenticating the received user-identification certificate using the at least one stored CA public key; and if the user-identification certificate is authenticated, authenticating the user based on the authenticated user-identification certificate.

4. The personal authentication device (PAD) of claim 3, wherein the one or more digital certificates comprises:

at least one user-qualification certificate indicating at least one service and one or more users who may access the at least one service;

and wherein the processing component comprises at least one component for authenticating the at least one received user-qualification certificate based on the at least one CA public key, if the user is authenticated; and if the at least one user-qualification certificate is authenticated, determining at least one service that the authenticated user may have access to based on the at least one authenticated user-qualification certificate.

5. The personal authentication device (PAD) of claim 1, wherein the at least one service key comprises at least one cookie.

6. The personal authentication device (PAD) of claim 5, wherein the processing component comprises at least one component for:

generating a one-time key and storing it in PAD;

based on the one-time key, generating the at least one cookie and sending the generated cookie to the user;

receiving the previously generated the at least one cookie, and validating the received cookie using the stored one-time key; and if the received cookie is successfully validated, invalidating the one-time key used in the cookie validation, generating a new one-time key and storing it in PAD, and based on the new one-time key, generating a new cookie and sending the new cookie to the user.

7. The personal authentication device (PAD) of claim 5, wherein the content in the one or more cookies comprises usage counts indicating the number of times one or more users have used one or more services.

8. The personal authentication device (PAD) of claim 4, wherein the one or more input means further receives one or more certificates comprising information for granting the user access to at least one additional service based on the at least one service.

9. The personal authentication device (PAD) of claim 1, wherein the processing component comprises at least one component for signing the at least one service key using the stored PAD private key.

10. The personal authentication device (PAD) of claim 1, the processing component comprises at least one component for decrypting contents on the one or more received digital certificates using the stored PAD private key, wherein the contents are encrypted with the corresponding PAD public key.

11. The personal authentication device (PAD) of claim 4, wherein the one or more digital certificates comprise at least one ticket-generation certificate indicating at least one service key generating program corresponding to the at least one service; and wherein the processing component comprises at least one component for authenticating the at least one ticket-generation certificate using the at least one stored CA public key; and if one or more ticket-generation certificates are authenticated, generating the at least one service key based on the at least one authenticated service key generating program, wherein the at least one service key may be used by a user to obtain access to at least one service.

12. The personal authentication device (PAD) of claim 3, wherein the one or more input means further receives one or more user credentials, and the processing component comprises at least one component for authenticating the user based on the authenticated user-identification certificate and the one or more received user credentials.

13. The personal authentication device (PAD) of claim 12, wherein the one or more user credentials comprise one or more user private keys.

14. The personal authentication device (PAD) of claim 12, wherein the one or more user credentials comprise a personal identification number (PIN) associated with the user, or information computed from the PIN.

15. The personal authentication device (PAD) of claim 12, wherein the one or more user credentials comprise biometric information associated with the user.

16. The personal authentication device (PAD) of claim 12, further comprising:

means for disabling the PAD if one or more attempts to authenticate the user based on the authenticated user-identification certificate and the one or more user credentials ends in failure.

17. The personal authentication device (PAD) of claim 1, wherein the one or more digital certificates comprises:

an operations certificate comprising information for controlling the operations of the PAD for a current session.

18. The personal authentication device (PAD) of claim 17, wherein the information for controlling the operations of the PAD for a current session comprises one or more of the following: information governing input and output of the PAD, challenge and response protocols for user and PAD authentication, secure protocols for receiving and outputting data, and protocols for PAD management purposes.

19. The personal authentication device (PAD) of claim 17, wherein the information for controlling the operations of the PAD for a current session comprises information governing linking of one or more received certificates, and wherein the processing component comprises at least one component for linking of one or more received certificates based on one or more certificates comprising information for granting the user access to at least one additional service based on the at least one service.

20. The personal authentication device (PAD) of claim 1, wherein the one or more input means receive one or more signature-verification certificates forming a signature-verification chain, wherein each signature-verification certificate in the signature-verification chain is signed with the private key of an entity whose public key is certified by the preceding signature-verification certificate and wherein the first signature-verification certificate in the signature-verification chain is signed by at least one stored CA public key; and wherein the processing component comprises at least one component for authenticating the one or more received digital certificates based on the last signature-verification certificate in the signature-verification chain.

21. The personal authentication device (PAD) of claim 1, wherein the PAD is tamper-resistant.

22. The personal authentication device (PAD) of claim 1, wherein the CA public keys and the PAD private key are written into the PAD only once.

23. The personal authentication device (PAD) of claim 1, further comprising:
a protection mechanism that erases the PAD private key from the at least one storage medium when there are unauthorized attempts in reading or modifying the PAD private key.

24. The personal authentication device (PAD) of claim 1, wherein at least one of the one or more input means is a reading device capable of receiving at least one of the one or more digital certificates and user credentials from a storage medium or network interface.

25. The personal authentication device (PAD) of claim 1, further comprising a clock for determining a current date and time.

26. The personal authentication device (PAD) of claim 1, further comprising one or more timers for determining time that has elapsed since a timer was reset.

27. The personal authentication device (PAD) of claim 1, further comprising one or more counters for determining a number of times an event has occurred since a counter was reset.

28. The personal authentication device (PAD) of claim 1, wherein the one or more digital certificates further comprise information which may reset clock, timers and counters of the PAD.

29. The personal authentication device (PAD) of claim 1, wherein the one or more digital certificates comprise a content decryption key and content rights that the PAD will check before outputting the content decryption key as a service key.

30. The personal authentication device (PAD) of claim 29, wherein the content rights comprise limits on at least one of the following: content expiration time, content usage period, content usage count.

31. The personal authentication device (PAD) of claim 25, wherein the processing component comprises at least one component for determining if the current date and time is within the validity period of the one or more received digital certificates.

32. The personal authentication device (PAD) of claim 25, wherein the processing component comprises at least one component for generating timestamps to be included in service keys that the PAD generates.

33. The personal authentication device (PAD) of claim 1, further comprising a write-once serial number.

34. The personal authentication device (PAD) of claim 33, wherein the processing component comprises at least one component for generating the at least one service key based on the serial number.

35. The personal authentication device (PAD) of claim 1, wherein the at least one ticket generation certificate further indicates a length of the at least one service key.

36. The personal authentication device (PAD) of claim 1, wherein the at least one ticket generation certificate further indicates a format for outputting the at least one service key.

37. The personal authentication device (PAD) of claim 1, wherein the information indicating the at least one service key generating program includes information of the at least one service key generating program stored on the PAD.

38. The personal authentication device (PAD) of claim 1, wherein the information indicating the at least one service key generating program includes information of the at least one service key generating program available via the one or more input means.

39. An authentication method comprising:
storing on a personal authentication device (PAD) at least one CA public key, each public key associated with a certificate authority (CA);
receiving one or more digital certificates, wherein the one or more digital certificates comprise at least one ticket-generation certificate including at least one service key generating program or information indicating at least one service key generating program;
authenticating the one or more received digital certificates using the at least one stored CA public key;
generating at least one service key based on the one or more authenticated digital certificates;
outputting the at least one service key;
storing on the personal authentication device (PAD) a PAD private key associated with the PAD and used by the PAD to authenticate the PAD to a user;
receiving a PAD authentication request from the user;
responding to the PAD authentication request using the stored PAD private key; and
outputting the response to the PAD authentication request.

40. The method of claim 39, further comprising:
authenticating the at least one received ticket-generation certificate using the at least one CA public key; and
if the at least one ticket-generation certificate is authenticated, generating at least one service key based on the at least one service key generating program, wherein the at least one service key may be used by a user to obtain access to at least one service.

41. The method of claim 39, further comprising:
receiving a user-identification certificate comprising information uniquely associated with a user;

authenticating the received user-identification certificate based on the at least one CA public key; and
if the user-identification certificate is authenticated, authenticating the user based on the authenticated user-identification certificate.

42. The method of claim 41, further comprising:
receiving at least one user-qualification certificates indicating at least one service and one or more users who may access the at least one service;
authenticating the at least one received user-qualification certificate based on the at least one CA public key; and
if the at least one user-qualification certificate is authenticated, determining at least one service that the authenticated user may have access to based on the at least one authenticated user-qualification certificate.

43. The method of claim 39, wherein the at least one service key comprises at least one cookie.

44. The method of claim 39, further comprising:
generating a one-time key and storing it on the PAD;
based on the one-time key, generating the at least one cookie and sending the generated cookie to the user;
receiving the previously generated the at least one cookie, and validating the received cookie using the stored one-time key; and
if the received cookie is successfully validated, invalidating the one-time key used in the cookie validation, generating a new one-time key and store it on the PAD, and based on the new one-time key, generating a new cookie and sending the new cookie to the user.

45. The method of claim 44, wherein the content in the one or more cookies comprises usage counts indicating the number of times one or more users have used one or more services.

46. The method of claim 39, further comprising:
signing the at least one service key using the stored PAD private key.

47. The method of claim 39, further comprising:
decrypting contents on the one or more received digital certificates using the stored PAD private key, wherein the contents are encrypted with the corresponding PAD public key.

48. The method of claim 42, further comprising:
if the authenticated user is determined to have access to the services, authenticating the at least one ticket-generation certificate using the at least one CA public key; and
if the at least one ticket-generation certificate is authenticated, generating at least one service key based on the at least one service key generating program, wherein the at least one service key may be used by a user to obtain access to at least one service.

49. The method of claim 42, further comprising:
granting the user access to at least one additional service based on the at least one service and received digital certificate information.

50. The method of claim 41, further comprising:
receiving one or more received user credentials; and
authenticating the user based on the authenticated user-identification certificate and the one or more user credentials.

51. The method of claim 50, wherein the user credentials comprise one or more user private keys.

52. The method of claim 50, wherein the user credentials comprise a personal identification number (PIN) associated with the user, or information computed from the PIN.

53. The method of claim 50, wherein the user credentials comprise biometric information associated with the user.

54. The method of claim 50, further comprising:
disabling the PAD if one or more attempts to authenticate the user based on the authenticated user-identification certificate and the one or more user credentials ends in failure.

55. The method of claim 39, further comprising:
receiving an operations certificate comprising information for controlling the operations of the PAD for a current session.

56. The method of claim 55, wherein the information for controlling the operations of the PAD for a current session comprises one or more of the following: information governing input and output of the PAD, challenge and response protocols for user and PAD authentication, secure protocols for receiving and outputting data, and protocols for PAD management purposes.

57. The method of claim 55, wherein the information for controlling the operations of the PAD for a current session comprises information governing linking of one or more received certificates, and wherein the method further comprises:
linking one or more received certificates based on one or more certificates comprising information for granting the user access to at least one additional service based on the at least one service.

58. The method of claim 39, further comprising:
receiving one or more signature-verification certificates forming a signature-verification chain, wherein each signature-verification certificate in the signature-verification chain is signed with the private key of an entity whose public key is certified by the preceding signature-verification certificate and wherein the first signature-verification certificate in the signature-verification chain is signed by at least one stored CA public key; and wherein the processing component comprises at least one component for authenticating the one or more received digital certificates based on the last signature-verification certificate in the signature-verification chain.

59. The method of claim 39, further comprising:
erasing the PAD private key when one or more unauthorized attempts to read or modify the PAD private key are detected.

60. The method of claim 39, wherein at least one of the one or more digital certificates is received from a storage medium or network interface.

61. The method of claim 39, further comprising determining a current date and time.

62. The method of claim 61, further comprising:
determining if the current date and time is within the validity period of the one or more received digital certificates.

63. The method of claim 39, further comprising determining elapsed time since a prior event.

64. The method of claim 39, further comprising determining the number of times an event has occurred since a prior event.

65. The method of claim 39, further comprising:
receiving one or more digital certificates which contain information for resetting current date and time, elapsed time, and a number of times an event has occurred.

66. The method of claim 65, further comprising:
resetting clock, timers or counters of the PAD based on information in the one or more digital certificates.

67. The method of claim 39, further comprising:
receiving one or more digital certificates which provide a content decryption key and content rights; and checking the content rights before outputting the content decryption key as a service key.

68. The method of claim 67, wherein the content rights comprise limits on at least one of the following: content expiration time, content usage period, content usage count.

69. The method of claim 61, further comprising:

generating timestamps based on the current date and time, the timestamps to be included in service keys that the PAD generates.

70. The method of claim 39, further comprising:

generating the at least one service key based on a write-once serial number.

71. The method of claim 70, further comprising:

including the serial number in the at least one service key.

72. The method of claim 39, wherein the at least one ticket generation certificate further indicates a length of the at least one service key.

73. The method of claim 39, wherein the at least one ticket generation certificate further indicates a format for outputting the at least one service key.

74. The method of claim 39, wherein the information indicating the at least one service key generating program includes information of the at least one service key generating program stored on the PAD.

75. The method of claim 39, wherein the information indicating the at least one service key generating program includes information of the at least one service key generating program available via one or more input devices.

* * * * *